No. 898,297.
PATENTED SEPT. 8, 1908.
E. L. WOOD.
SELF LUBRICATING SHAFT.
APPLICATION FILED JUNE 14, 1907.
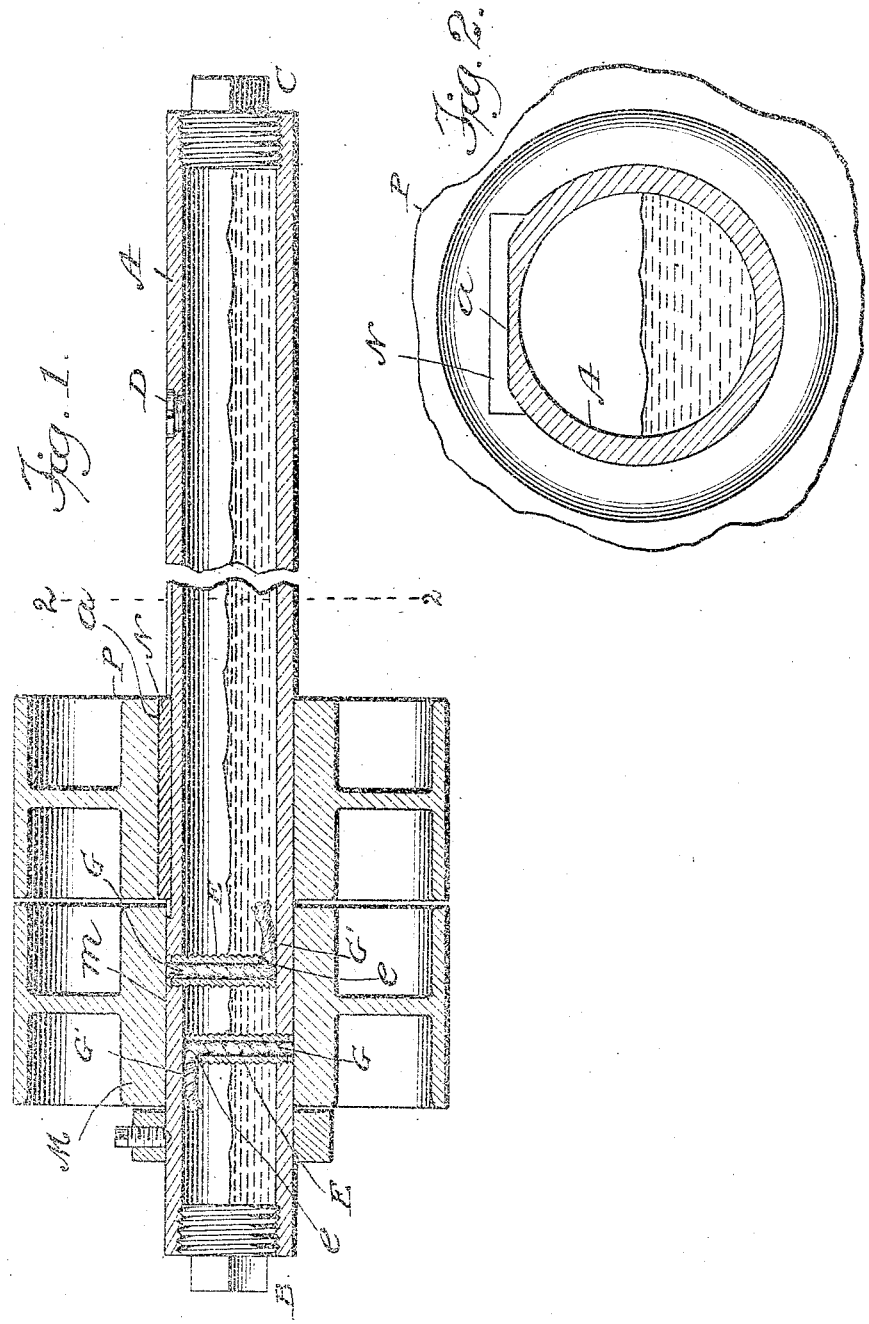

UNITED STATES PATENT OFFICE.

EDWARD L. WOOD, OF LONG ISLAND CITY, NEW YORK.

SELF-LUBRICATING SHAFT.

No. 898,297.  Specification of Letters Patent.  Patented Sept. 8, 1908.

Application filed June 14, 1907. Serial No. 378,912.

*To all whom it may concern:*

Be it known that I, EDWARD L. WOOD, a citizen of the United States, residing in Long Island City, in the county of Queens and State of New York, engineer, have invented a certain new and useful Improvement in Self-Lubricating Shafts, of which the following is a specification.

There is difficulty in lubricating shafting revolving at high velocities, because centrifugal force repels the oil. I put the oil inside. This has been before proposed but I have made improvements which are radical and important. I provide convenient and reliable means of insuring a slow discharge under all conditions, with an increased rate of discharge when the shaft is revolved.

The invention is particularly useful for a loose pulley, revolving alongside of a fast pulley and I will describe it as thus applied.

I make the shaft, or that portion of it which constitutes the bearing for the loose pulley, a heavy drawn tube, for which the material is preferably a moderately high carbon steel, say, 70 hundredths of one per cent. carbon. The ends are tightly secured. An aperture in one side is closed by a tight fitting screw which being easily removed, affords means to supply additional lubricant from time to time. I can employ any ordinary lubricant. I prefer ordinary limpid lubricating oil.

I tap into the main tube a pair of small tubes reaching in opposite directions nearly across the interior. The inner end of each is notched. Before introducing these tubes into their places, I insert in each a hard braided cord which is little longer than the diameter of the shaft, and serves as a slow acting wick.

The following is a description of what I consider the best means of carrying out the invention.

The accompanying drawings form a part of this specification.

Figure 1 is a central longitudinal section, and Fig. 2 is a transverse section on the line 2—2 in Fig. 1, on a larger scale.

Similar letters of reference indicate like parts in all the figures where they appear.

A is a tube which constitutes the shaft and M is the center portion of a loose pulley. The tubular shaft is polished to present the proper surface to run in bearings $m$ shown as in the center of the loose pulley, or my self-lubricating shaft may be stationary and allow the loose pulley to run at any desired velocity around it. My shaft will serve well in either condition, but it is of most advantage when running as first suggested, because then centrifugal force is developed in the shaft itself. My invention has no effect on the pulley beyond affording a just sufficient and uniform bearing on the shaft.

B is an axial screw-plug which serves as a tight stop or seal. The screw-threads hold these parts together very firmly. C is a screw-plug at the opposite end.

D is a lateral screw-plug having the under face of its head nicely finished and matched into a corresponding seat. A proper recess should be sunk to a sufficient depth in this screw in which to engage a key to forcibly turn to insert or remove the screw-plug, without interfering with the application of a pulley, or with any other use to which the shaft may be subjected.

E E are wick tubes. I have in my experiments used soft steel say, 10 to 20 hundredths of one per cent. carbon for the main tube A and brass for these wick tubes. The latter carry each a tightly fitting wick G which is a little longer than the wick tube. The surplus wick $G^1$ is bent at right angles and extends out in a notch $e$ into the interior of the tube A.

The centrifugal force is neutralized when the shaft is running at high velocity because the wick tubes being similar and inserted in pairs extending in opposite directions, balance each other. The oil is certain to reach the end $G^1$ of each wick. But the centrifugal force tends to prevent its moving across the shaft so as to exude at the other end of the wick tube, except very slowly.

When the shaft is standing still, there is very little escape of oil, because when the arrangement presents the inner end downward to receive oil, the outer end is up so as to prevent its escape.

When the invention is employed in situations where it is subjected to long periods of rest, it is preferred to fill it only about quarter full.

P is a fixed pulley keyed on the shaft A alongside of the loose pulley M. I make a wide and shallow key seat in the pulley P and employ a key N of corresponding width. Before putting the parts together I flatten by hand or by machinery, a sufficient surface $a$ on the exterior of my tube A and form the adjacent face of the key N to match. This key is driven in and removed with the same general effect as an ordinary key and it holds the pulley firmly. The arrangement keys the pulley on the thin hollow shaft without materially weakening the construction.

Modifications may be made without departing from the principle or sacrificing the advantages of the invention. I can make the whole length of the shaft hollow, and in some situations such would be desirable, for the reason among others, that it would serve for a longer period without replenishing. The proportions may be varied with regard to the thickness of the part A. I can use ordinary tubing, or from that to a very heavy tube. I can have merely a small passage along the axis of the tube. The tubes E may be of such length as to extend quite across the interior of the hollow shaft but I prefer to make them of such length that their free ends are about one quarter inch within the interior. The wicks may vary in length, I prefer to have them extend out about a quarter inch into the partially oil-filled hollow interior of the shaft.

The invention may be used to lubricate bearings of various sizes and for various purposes.

I claim as my invention:—

1. A tubular shaft provided with a filling aperture and closing means therefor, a wick tube extending diametrically nearly across and opening at one end through the periphery, the other end being within such tubular shaft, in combination with another parallel wick tube similarly conditioned but reversely arranged.

2. A tubular shaft provided with a filling aperture and closing means therefor, a wick tube extending diametrically nearly across and opening at one end through the periphery, the other end being within such tubular shaft, in combination with another parallel wick tube similarly conditioned but reversely arranged and with two wicks fitting tightly in the respective wick tubes, each having its end extending into the oil space in the interior of the tubular shaft.

Signed at New York, N. Y., this 13th day of June 1907.

E. L. WOOD

Witnesses:
THOMAS DREW STETSON,
HELEN A. CLAUTICE.